Figure 7:
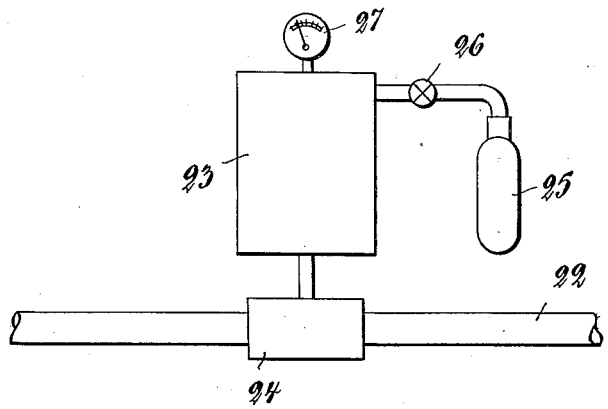

Sept. 26, 1933.  E. G. SIEVERT ET AL  1,928,575
HIGH TENSION CABLE
Filed May 15, 1929    2 Sheets-Sheet 1
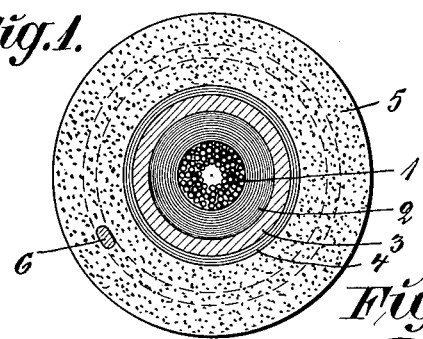
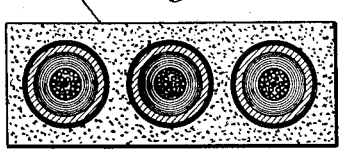
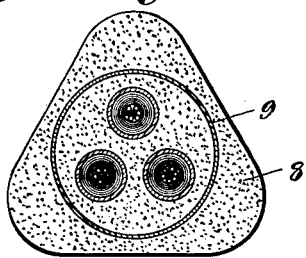
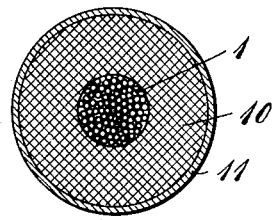
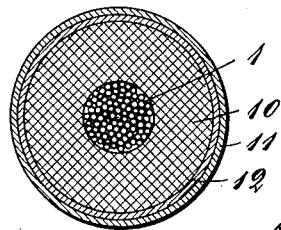
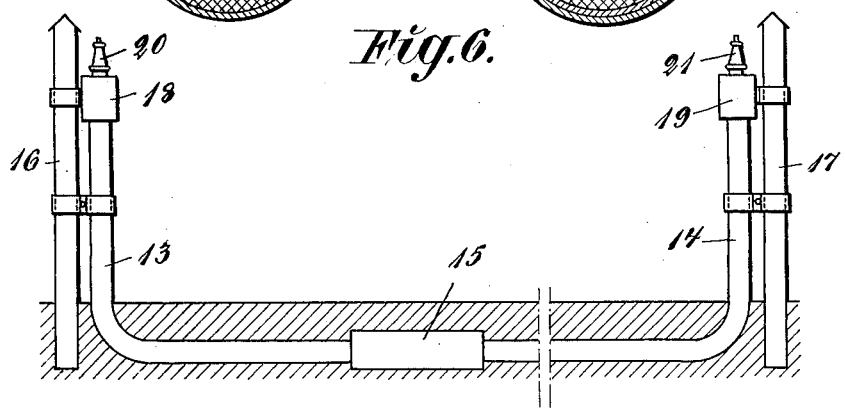

Sept. 26, 1933.  E. G. SIEVERT ET AL  1,928,575
HIGH TENSION CABLE
Filed May 15, 1929   2 Sheets-Sheet 2

E. G. Sievert &
B. S. F. Ell
INVENTORS

By Marks & Clark
Attys.

Patented Sept. 26, 1933

1,928,575

UNITED STATES PATENT OFFICE 1,928,575

HIGH TENSION CABLE

Ernst Gustav Sievert, Stockholm, and Bernhard Sophus Faith Ell, Spanga, Sweden, assignors to Telefonaktiebolaget L. M. Ericsson, Stockholm, Sweden, a company of Sweden Application May 15, 1929, Serial No. 363,288, and in Sweden May 16, 1928

1 Claim. (Cl. 173—266)

The modern high tension-cable engineering has to take into account the expansion and contraction of the impregnating oil occurring in the insulation layer of the cable on account of heating during periods of service and cooling during currentless intervals respectively. By the expansion of the oil the lead sheath is namely subjected to an expansion even if special expansion vessels are provided. When the oil contracts upon the cooling of the cable vacuum cavities are easily produced the filling out of which with oil, for instance, from the expansion vessels, requires more or less time dependent upon the design of the cable as well as the degree of cooling. If the cable is again subjected to the working voltage before these vacuum cavities have had time to be completely filled with oil, glow discharge phenomena occur in the vacuum cavities, whereby the insulation material slowly deteriorates.

According to the present invention these vacuum formations should be counter-acted or prevented in a more direct manner without the necessity of bringing the oil in motion in the cable. The invention substantially consists therein that the lead sheet of the cable is tightly enclosed along its entire length by a non-elastic cover of concrete allowing the pressure of the impregnating medium in the cable to vary or to be varied within wide limits without the cross-section area of the cable being altered. By this arrangement the expansion vessels otherwise required in high tension cables can be omitted and the insulation medium may, accordingly, remain staying inside the cable.

The junction and terminal boxes of the cable are of course also designed for the same inner pressure in the cable so as to prevent oil leakage in any place of the closed cable system. The cable may, if desired, be divided into a number of closed sections in order to prevent oil leakage along the entire cable length in case a single faulty point should occur in the cable cover.

A cable according to the invention has several important advantages over hitherto known cables of this kind. Due to the fact that the impregnating medium does not move longitudinally in the cable the occurrence of vacuum cavities is prevented and thus, ionization is eliminated which results in an increased length of life of the cable. Thanks to the high pressure and the absence of vacuum cavities the cable obtains an increased disruptive strength and the di-electric loss angle becomes small and invariable at different voltages and during different working conditions. The cable proper becomes also cheaper as the insulation layer can be made thinner and accordingly the cross-section of the cable correspondingly lessened. Moreover, cable according to the invention does not require to be armoured as is otherwise necessary.

Figure 8:
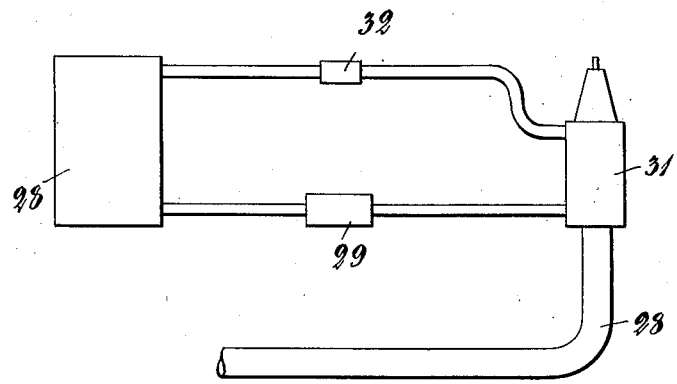

The invention is illustrated on the accompanying drawings. Figures 1 to 5 show cross-sections of cables of different designs. Figure 6 illustrates the laying out of the cable according to the invention. Fig. 7 and 8 show different arrangements for maintaining high pressures in the cable.

In Figure 1 the conductor is designated by 1. In the example shown it is composed of wires and provided with a central cavity intended to receive and convey an insulating oil. The conductor is provided with an outer insulation 2 which by way of example may consist of oil impregnated paper. Provided around this insulation is a lead sheath 3 which on the outside is covered by a layer 4 consisting for instance of impregnated paper or fabric. The cable thus composed is cast into concrete which forms a cylindrical covering 5 tightly enclosing the cable and which is provided into an armouring 6 preferably consisting of a helical wire disposed concentrically in relation to the cable. Instead of such a helical wire the cable may be armoured by means of metal wires extending axially of the cable or, as the case may be, by a cylindrical metal tube. In some cases the armouring of the cable may be entirely omitted.

The covering of the cable with concrete carried out is preferably on the spot when laying down the cable by casting a suitable concrete mixture around the cable. The covering may of course have any arbitrary cross-section.

When laying out a plurality of cables side by side they may be cast in one and the same piece of concrete 7, as shown in Figure 2. This embodiment is especially preferable when laying down cables in streets beneath the pavements.

Figure 3 shows another manner of enclosing several cables or a plurality of insulated conductors within one and the same covering. According to this figure the concrete covering 8 has a triangular cross-section corresponding to the mutual disposition of the cables. In this embodiment the cable is armoured by means of a thin metal tube 9.

Figures 4 and 5 show embodiments in which the outer covering consists of a tube 11 of metal, such as steel, copper, or brass which is sufficiently strong to resist the prevailing high pressures. The tube 11 is in Figure 4 disposed in direct contact with the rubber insulation 10 surrounding the conductor 1. The cable in Figure 5 is provided with a lead sheath 12 disposed between the insulation 10 and the tube 11.

Figure 6 shows diagrammatically the laying down of a cable of the type in question. The cable is preferably divided into a number of each hermetically sealed sections 13, 14 united by means of tightly fitting joining sleeves 15. The ends of the cable may as shown in the Figure, be mounted on poles 16, 17 and may be provided with end sleeves 18, 19 from which the conductor projects through an insulator 20 or 21 respectively.

The pressure within a cable according to the invention may vary within wide limits on account of fluctuating current load and thereby caused variations in temperature, by way of example from one or a few tens of atmospheres at a currentless cable up to several hundred atmospheres.

The invention may be applied to any kind of heavy current cables such as under-ground cables, shore-cables, mining-cables, etc.

Figure 7 shows a cable 22 provided with an expansion vessel 23 communicating through a junction box 24 with the interior of the cable so as to allow the insulating substance to flow into the vessel 23 when expanding due to the cable being heated. Connected to the upper part of the vessel 23 is a bottle 25 for high pressure gas containing for instance carbonic acid in a liquid state and adapted to supply gas at a high pressure to the vessel 23. The vessel 23 and the bottle 25 may be normally in open communication with each other so as to maintain a constant pressure in the vessel 23 but if desired the bottle 25 may be normally cut off by means of a cock 26 and connected to the vessel only occasionally when required to compensate for leakage the pressure in the vessel being controlled by means of a pressure gauge 27. When using carbonic acid in the bottle 25 the pressure in the vessel 23 may be raised to about 50 atmospheres but also lower pressures for instance any pressure between 5 and 50 atmospheres may be used. By using other compressed gases in the bottle 25 even higher pressures than 50 atmospheres may be maintained in the vessel 23. In any case the pressure acting on the insulating substance in the vessel 23 must be sufficient to prevent the formation of vacuum cavities in said substance when the latter is contracting on the cooling of the cable. In other words, the pressure must be sufficient to overcome fully the frictional resistance of the insulating substance when moving longitudinally in the cable. The cable must, of course, be designed so as to be capable of resisting very high pressures and should be constructed for that purpose in the way above described.

Figure 8 illustrates an arrangement by means of which a substantially constant pressure may be maintained in a cable 28 by means of a pump 29 adapted to pump the insulating substance, for instance oil, from a container 30, into the cable through an end box 31 when the insulating substance is contracting, on account of the cable being cooled down. When the cable is heated, on the other hand, the oil is allowed to return into the container 30 through an automatic valve 32 which is adapted to open at a certain pressure in the cable. The pump may operate automatically under the control of the pressure in the cable so as to maintain substantially a constant pressure.

We claim:—

In a high tension lead sheathed cable, an insulation therefor which is tightly enclosed and maintained throughout the cable at a high over-pressure, and an outer non-elastic and non-expansible covering consisting of concrete tightly applied to the whole surface of the lead sheath so as to prevent deformation of the lead sheath under influence of the inner over-pressure.

ERNST GUSTAV SIEVERT.
BERNHARD SOPHUS FAITH ELL.